United States Patent [19]

Chen et al.

[11] 4,370,243
[45] Jan. 25, 1983

[54] OIL RECOVERY BY SURFACTANT-ALCOHOL WATERFLOODING

[75] Inventors: Catherine S. H. Chen, Berkeley Heights; Yuhshi Luh, Trenton, both of N.J.

[73] Assignee: Mobil Oil Corporation, New York, N.Y.

[21] Appl. No.: 232,474

[22] Filed: Feb. 9, 1981

[51] Int. Cl.$^3$ .............................................. E21B 43/22
[52] U.S. Cl. .............................. 252/8.55 D; 166/274; 166/275
[58] Field of Search ............... 252/8.55 D, 8.55 R; 166/274, 275

[56] References Cited

U.S. PATENT DOCUMENTS

| | | | |
|---|---|---|---|
| 2,341,500 | 2/1944 | Detling | 252/8.55 X |
| 3,422,890 | 1/1969 | Darley | 166/274 |
| 3,474,865 | 10/1969 | Gogarty et al. | 166/275 X |
| 3,797,574 | 3/1974 | Feuerbacher et al. | 166/274 |
| 4,193,452 | 3/1980 | Wilson et al. | 252/8.55 X |
| 4,216,097 | 8/1980 | Stournas | 252/8.55 |
| 4,236,579 | 12/1980 | Kalfoglou | 166/274 |

*Primary Examiner*—Herbert B. Guynn
*Attorney, Agent, or Firm*—Charles A. Huggett; Michael G. Gilman; Edward F. Kenehan, Jr.

[57] ABSTRACT

Waterflooding process for the recovery of oil from a subterranean formation in which at least a portion of the injected water preferably comprises a preferentially oil-soluble alcohol, a sulfobetaine, a quaternary ammonium compound containing at least one long chain hydrocarbyl group and a quaternary ammonium compound with short chain hydrocarbyl groups. This formulation serves both as a surfactant and a mobility control agent.

12 Claims, No Drawings

OIL RECOVERY BY SURFACTANT-ALCOHOL WATERFLOODING

BACKGROUND OF THE INVENTION

Field of the Invention

This invention relates to a method of increasing the viscosity of an injection stream used in the recovery of oil from subterranean oil reservoirs and, more particularly, to waterflooding operations involving the injection of an aqueous solution or dispersion containing a surfactant solution.

In the recovery of oil from oil-bearing reservoirs, it usually is possible to recover only minor portions of the original oil in place by the so-called primary recovery methods which utilize only the natural forces present in the reservoir. Thus, a variety of supplemental recovery techniques has been employed in order to increase the recovery of oil from subterranean reservoirs. The most widely used supplemental recovery technique is waterflooding, which involves the injection of water into the reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus, it has been proposed to add surfactants to the flood water in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Processes which involve the injection of aqueous surfactant solutions are commonly referred to as surfactant waterflooding or as low tension water-flooding, the latter term having reference to the mechanism involving the reduction of the oil water interfacial tension. Thus far, many such waterflooding applications have employed anionic surfactants. For example, a paper by W. R. Foster entitled "A Low-Tension Waterflooding Process", Journal of Petroleum Technology, Vol. 25, February 1973, pp. 205–210, describes a promising technique involving the injection of an aqueous solution of petroleum sulfonates within designated equivalent weight ranges and under controlled conditions of salinity. The petroleum sulfonate slug is followed by a thickened water slug which contains a viscosifier such as water-soluble biopolymer in a graded concentration in order to provide a maximum viscosity greater than the viscosity of the reservoir oil and a terminal viscosity near that of water. This thickened water slug is then followed by a driving fluid such as a field brine which is injected as necessary to carry the process to conclusion.

One problem encountered in waterflooding with certain of the anionic surfactants such as the sulfonates is the lack of stability of these surfactants in a so-called "high brine" environment. These surfactants tend to precipitate from solution in the presence of monovalent salts such as sodium chloride in concentrations in excess of about 2 to 3 weight percent and in the presence of much lower concentrations of divalent metal ions such as calcium and magnesium ions. Typically, divalent metal ion concentrations of about 50 to 100 ppm and above cause precipitation of the petroleum sulfonates. The salinity of the surfactant slug is also significant with regard to interfacial tensions achieved through the use of petroleum sulfonates such as disclosed in the Foster paper. Even in the absence of divalent metal ions, optimum interfacial tensions are seldom achieved at salinities significantly in excess of 2 to 3 weight percent.

Various surfactant formulations which contain anionic sulfonates that tolerate high salinities and/or high divalent metal concentrations have been proposed for use in high brine environments. Thus, U.S. Pat. No. 3,827,497 and U.S. Pat. No. 3,890,239 disclose a surfactant composition comprising a mixture of an organic sulfonate and a sulfated or sulfonated oxyalkylated alcohol and a polyalkylene glycol alkyl ether. The sulfonate is exemplified by the formula

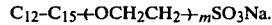

$$C_{12}\text{-}C_{15}\text{-}(OCH_2CH_2)_m\text{-}SO_3Na.$$

This is a sulfonate where m is an average of 3.

U.S. Pat. No. 4,216,097 teaches the use of sulfobetaines as agents in waterflooding.

SUMMARY OF THE INVENTION

In accordance with the present invention, there is provided a new and improved waterflooding process employing a solution or a dispersion comprising a quaternary ammonium salt containing at least one long-chain constituent as a mobility control agent. Preferably the solution comprises said ammonium salt, a sulfobetaine and alcohol as the surfactant and a quaternary ammonium salt, wherein the hydrocarbyls contain from 1 to 4 carbon atoms, as a sacrificial chemical. In carrying out the invention, at least a portion of the fluid introduced into the oil reservoir via a suitable injection system is an aqueous liquid containing a preferentially oil-soluble alcohol of limited water solubility and the quaternary ammonium anionic surfactant (or sulfobetaine) mentioned. In a preferred embodiment of the invention, the preferentially oil-soluble alcohol is an aliphatic alcohol containing from 5 to 7 carbon atoms, which alcohol is employed in a concentration such that the volumeric/weight ratio thereof to the quaternary ammonium surfactant is within the range of 0.1 to 2.

Thus, as a preferred embodiment this invention resides in the combination of:

(1) An effective surfactant mixture: a sulfobetaine and an aliphatic alcohol;

(2) A thickening agent: a quaternary ammonium compound containing at least one long-chain hydrocarbyl group; and (3) A sacrificial agent which minimizes the adsorption loss of both the sulfobetaine surfactant and the thickening agent.

DESCRIPTION OF SPECIFIC EMBODIMENTS

Recovery of oil by chemical flooding from high brine reservoirs is extremely difficult. The difficulty increases with the increase in reservoir salinity and with the decrease in reservoir permeability. The Low Tension Water Flood Process, when applied to very high salinity reservoirs, such as Mobil's West Burkburnett, needs substantial modifications to recover oil successfully. It is known to be difficult to reduce the salinity of the reservoirs by preflush with low salinity water to the levels that the petroleum sulfonate type surfactants and the polysaccharide mobility control agent can function as designed. The loss of petroleum sulfonate type surfactants by precipitation with the divalent and multivalent cations or by adsorption onto the reservoir rocks is a serious and costly problem. When brinetolerant surfactants, such as alkylarylpoly(ethoxy)alkane sulfonates, are used under high salinity conditions, two serious problems arise: (1) Forbiddingly high adsorption loss and (2) frequent formation of brine-oil emulsion resulting in high pressure development. In addition to the above problems associated with the surfactants, the loss of polysaccharide mobility control agent and the plugging of the reservoir rocks by gelation and filtration presents another serious problem. We have invented chemical formulations which reduce all the above problems. Each formulation contains a brinetolerant surfactant of the sulfobetaine type, a cosurfactant or cosolvent such as hexanol, a sacrificial chemical of the quaternary ammonium salt type which reduces surfactant loss due to adsorption and a nonpolymeric mobility control agent which is a quaternary ammonium salt containing at least one long chain substituent. We have found, in connection with the present invention, that a mixture of sulfobetaines and hexanol or other aliphatic alcohol is far more effective than sulfobetaines alone.

Applicants' invention involves surfactant waterflooding in which such quaternary ammonium compounds, which are well known in the art, are employed in conjunction with alcohols under conditions such that the surfactant and alcohol exhibit oil solubility preferences. More specifically, the alcohol which is both water and oil-soluble is preferentially oil-soluble. That is, with equal amounts of oil and water, a greater amount of the alcohol will dissolve in the oil than in the water, or, stated otherwise, if the alcohol is exposed to both oil and water phases, the alcohol will tend to partition between the two with a greater concentration in the oil phase. The preferred alcohols may be characterized as having a water solubility at the reservoir temperature of less than 3.0 weight percent and preferably less than 1.0 weight percent and as being substantially oil miscible. The preferred surfactant employed in conjunction with the alcohol is preferentially oil-soluble also.

The quaternary ammonium compound of the invention (which is the mobility control agent) has the formula

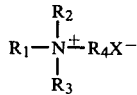

wherein $R_1$, $R_2$, $R_3$ and $R_4$ are hydrocarbyl groups, at least one of which is a hydrocarbyl group containing 16 to 20 carbon atoms, preferably an aliphatic group or aliphatic-substituted aryl group containing 16 to 20 carbon atoms, and the others are hydrocarbyl groups containing 1 to 20 carbon atoms, preferably selected from the group consisting of (1) aliphatic groups containing from 1 to 20 carbon atoms, preferably 1 to 4 carbon atoms and (2) aliphatic-substituted aryl groups containing 7 to 20 carbon atoms, and X is, for example, halogen or $NO_3$. Thus, the lipophilic base of the above-defined mobility control agent employed in the present invention may be preferably provided by aliphatic groups and aliphatic-substituted aryl groups, where the aryl component may be mononuclear (phenyl) or dinuclear (naphthyl). Preferably the aryl component will be mononuclear in view of the practical consideration of economy and product availability. The aliphatic substituents may be unsaturated and/or contain branched chains or may take the form of normal alkyl radicals. The long-chain group is preferably alkyl or alkaryl containing from 16 to 20 carbon atoms. That is, it may be, for example, (1) a hexadecyl, an octadecyl or an eicosyl group, (2) benzene substituted with, for example, a decyl or a tetradecyl group, or (3) naphthyl substituted with, for example, a hexyl or decyl group. The remaining groups are preferably alkyl, e.g. methyl, butyl, octyl, dodecyl, tetradecyl, octadecyl or eicosyl groups, or alkaryl, e.g. phenyl or naphthyl substituted with an alkyl group exemplified by those just enumerated.

In addition to the quaternary ammonium compound containing the long-chain substituent and the preferentially oil-soluble alcohol, each formulation used in this invention contains a brine-tolerant surfactant of the sulfobetaine type, i.e. one having the formula

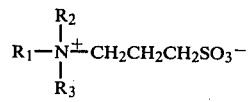

wherein $R_1$, $R_2$ and $R_3$ have the same meaning as above and a mobility agent. $R_1$, $R_2$ and/or $R_3$ may also be substituted with, for example, a hydroxyl or other group. In addition, a quaternary ammonium compound

wherein $R_5$ is a $C_1-C_4$ alkyl group, and X is bromine, chlorine, iodine or nitrate ($NO_3$) is used as the sacrificial chemical.

The effectiveness of the instant combinations in view of the known activity of sulfobetaine surfactants when used with an oil-soluble alcohol is surprising. Sulfobetaine surfactants when used with an oil-soluble alcohol (e.g., hexanol) produce ultra-low water-oil interfacial tension under high salinity conditions an order of magnitude lower than sulfobetaines alone. The mixtures can recover 100% oil from laboratory sand packs and the oil recovery efficiency is not sensitive to the sulfobetaine-alcohol ratio resulting in that these formulations are practically applicable in the fields. However, the adsorption loss of brine-tolerant surfactants under high salinity conditions is prohibitively high and sulfobetaines are no exceptions. Our discovery that low-cost quaternary ammonium salts are effective sacrificial chemicals for the sulfobetaine surfactants make the use of these brine-tolerant surfactants economically feasible. One outstanding feature of the present surfactant systems as compared to most other brine-tolerant surfactants is that there is no pressure development during the oil recovery, making them especially suitable for reservoirs of low permeability, such as Mobil's West Burkburnett. In addition, our discovery of novel non-polymeric single-component mobility control agents makes our chemical flooding processes to recover oil from high salinity reservoirs complete. In contrast to the commercially available polymeric mobility control agents, poly(acrylamideacrylic acid) and polysaccharide biopolymer, our mobility control agents work better under high salinity conditions. An outstanding feature of our total formulations containing surfactant; cosurfactant (or cosolvent), sacrificial chemical, and mobility control agent can be used as a single slug to effectively recover all the residual oil.

The laboratory oil displacement tests were carried out employing 6-foot long flow tubes having an inside diameter of about ¼ inch. In each tube run, the tube was packed with unconsolidated Berea sand and then saturated with saline water. The crude oil was then flooded into the tube until the effluent from the tube contained no water, with the total amount of water being displaced from the tube during this operation being measured to determine the initial oil saturation. Each tube was then subjected to a simulated waterflood by injecting a brine in an amount as necessary until the effluent was free of oil. The amount of oil produced during this operation was measured in order to determine the residual oil saturation after waterflood of the tube. A simulated surfactant waterflood was then carried out by injecting an aqueous surfactant slug followed by the injection of a driving fluid until the effluent from the tube was free of oil. The amount of oil recovered during this operation was measured in order to arrive at the final residual oil saturation and the amount of tertiary oil recovered. Except as noted hereinafter, the water used in the initial water saturation step, the simulated waterflood, the surfactant slug and the drive fluid was brine containing 13.2 wt. % NaCl, 3.47 wt. % $CaCl_2 \cdot 2H_2O$ and 1.53 wt. % $MgCl_2 \cdot 6H_2O$.

Having described the present invention in broad, general terms, the following will illustrate specific aspects of the development. They are meant to illustrate the invention only, not to limit it. All the Examples below employed West Burkburnett-produced oil and synthetic West Burkburnett brine, which contained the concentrations of salts disclosed in the paragraph next above. To simulate all types of reservoirs, brine wet, oil wet and aged brine wet Berea sandpack 6' columns were used, as follows:

1. Brine wet column—The column was packed with dry Berea sand, evacuated and filled with brine to determine the pore volume, oil-flooded until no more brine was produced and brineflooded until no more oil was produced to determine the amount of residual oil;

2. Oil wet column—The column was packed with Berea sand, dried at 90° C. and 1 mm Hg pressure for more than four hours. The column was evacuated, filled with oil to determine the pore volume and brine-flooded until no more oil was produced to determine the amount of residual oil.

3. Aged brine wet column—The column was packed with dry Berea sand, evacuated and filled with brine to determine the pore volume and oil-flooded until no more brine was produced. The column was then capped at both ends and aged for a period of time (e.g., 5 to 6 months). Then the column was brine-flooded until no more oil was produced to determine the amount of residue oil.

EXAMPLE I

A brine wet column was flooded with a surfactant solution containing 2 wt. % of

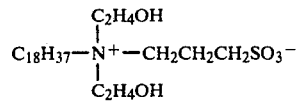

and 1 wt. % of n-hexanol in brine in a continuous mode. Oil started to produce after 0.9 pore volume injection. 50% oil was produced after 1.5 pore volumes injection, and 100% oil was produced after 1.9 pore volumes injection. No pressure development was observed. The surfactant adsorption loss was determined to be 6 mg per gram of dry sand—too high to be economical. Most of the hexanol partioned to the oil phase and was recovered with the oil.

EXAMPLE II

A brine wet column was flooded with one pore volume of the surfactant solution described in Example I, followed by brine in the continuous mode until no more oil was produced. The total oil recovery was only 25%. The column was then flooded with a solution containing 2 wt. % of tetraethylammonium bromide $[(C_2H_5)_4N^+Br^-]$ in brine, oil production resumed and continued until 100% production. The results showed that the tetraethylammonium bromide freed the adsorbed surfactant to recover oil, or the less expensive quaternary ammonium salt was a sacrificial chemical for the more expensive sulfobetaine surfactant. However, no more hexanol needed to be supplied. No pressure development was observed.

EXAMPLE III

Into a brine wet column was injected 0.25 pore volume of a surfactant solution in brine containing a sacrificial chemical. The solution contained 2 wt. % of the $C_{18}$ surfactant of Example I, 1.4 wt. % of n-hexanol and 3 wt. % of tetraethylammonium bromide. The surfactant injection was followed by a mobility control solution containing hexadecyltrimethylammonium bromide (1.5 wt. %) and tetraethylammonium bromide (1.5 wt. %) in brine and having a viscosity of 12 centipoise at 23 $sec^{-1}$ and room temperature. Oil started to produce after 0.6 pore volume; 50% oil was produced after 1.4 pore volumes; and 100% oil was produced after 2 pore volumes. No pressure development was observed.

EXAMPLE IV

An aged (6.5 months) brine wet column was injected with 0.5 pore volume of the surfactant and sacrificial solution was described in Example III, followed by the mobility control solution as described in Example III. Oil production commenced after 0.25 pore volume injection; 50% oil was recovered after 1.8 pore volumes and 100% after 2.6 pore volumes. No pressure development was observed.

EXAMPLE V

An oil wet column was injected with 0.5 pore volume of the surfactant-sacrificial chemical solution followed by the mobility control solution as described in Example IV. Oil production commenced after 0.6 pore volume injection; 50% oil was produced after 2 pore volumes and 100% after 2.7 pore volumes.

EXAMPLE VI

A solution containing 3 wt. % of hexadecyltrimethylammonium bromide, 1 wt. % of $C_{18}H_{37}N^+(CH_3)_2CH_2CH_2CH_2SO_3^-$ and 0.5 wt. % of n-hexanol in brine was found to have both high surface activity and high viscosity (70 centipoise at 23 sec$^{-1}$ and 40° C.). This solution was used both as a surfactant and mobility control agent in a single slug. A brine wet column was injected with one pore volume of this dual-function solution, followed by brine until no more oil was produced. Complete oil recovery was accomplished.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716 to Burdyn et al. Other well arrangements may be used in carrying out the present invention, examples of which are set forth in the Burdyn et al. patent. By the term "pore volume" as used herein is meant that volume of the portion of the formation underlying the well pattern employed, as described in greater detail in the Burdyn et al. patent.

The present invention may be carried out in conjunction with the use of a thickening agent added for mobility control purposes. As indicated by the previously described displacement tests, the thickening agent may be added to the aqueous solution of alcohol and surfactant or it may be injected in a separate mobility control slug. Where a separate mobility control slug is employed, it normally will be injected immediately after the slug containing the surfactant. The thickening agent may be added in concentrations so as to provide a graded viscosity at the trailing edge of the mobility control slug as disclosed in the aforementioned paper by Foster or graded viscosities at both the leading and trailing edges of the mobility control slug as disclosed in U.S. Pat. No. 4,018,281 to Chang. Alternatively, the thickening agent concentration may be relatively constant throughout. Normally, the viscosity of at least a portion of the mobility control slug should be at least as great as that of the reservoir oil and typically it will be within the range of about 1 to 4 times the viscosity of the reservoir oil. Various thickening agents which may be employed for mobility control purposes are well known to those skilled in the art and include such polymers as the biopolymer "Kelzan", previously identified, and the various partially hydrolyzed polyacrylamides available from the Dow Chemical Company under the trade name "Pusher" chemicals.

The sulfobetaine surfactant may be present in any suitable concentration depending upon the characteristics of the particular reservoir involved and such factors as surfactant consumption, e.g. by adsorption, and dispersion of the surfactant into the reservoir water. Its concentration in the surfactant slug may range from about 0.25 to about 3 weight percent, although in most applications the surfactant will be employed in a concentration within the range of from about 0.5 weight percent to about 2.0 weight percent. The alcohol concentration will, of course, depend upon the concentration of the surfactant and the desired ratio. A ratio of surfactant to alcohol of 3 to 1 to 2 to 1 is preferred. The aqueous liquid containing the alcohol and sulfobetaine surfactant may be injected in amounts ranging from about 0.1 to about 1.0 pore volumes with the larger pore volume amounts being used with the lower surfactant concentrations. Usually it will be desired to inject the alcohol surfactant solution in an amount within the range of from about 0.25 to about 0.5 pore volumes.

The mobility control agent, i.e. the long chain containing quaternary ammonium compound, will be present in the surfactant slug in concentrations ranging from about 0.1 weight percent to about 5 weight percent, preferably from about 1 to about 3 weight percent. Finally, the sacrificial quaternary ammonium compound in the surfactant slug will range from about 0.5 to about 5 weight percent, preferably from about 1 to about 3 weight percent.

We claim:

1. In a method for the recovery of oil from a subterranean oil reservoir penetrated by spaced injection and production systems in which an aqueous fluid is introduced into said reservoir via said injection system to displace oil to said production system, the improvement comprising employing in all or part of said aqueous fluid the following:

(a) a mixture of sulfobetaine of the formula

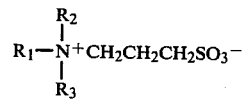

wherein $R_1$, $R_2$ and $R_3$ are hydrocarbyl groups containing 1 to 20 carbon atoms or said hydrocarbyl groups substituted with a hydroxyl group, and a preferentially oil-soluble aliphatic alcohol;

(b) an organic quaternary ammonium compound of the formula

wherein $R_5$ is an alkyl group containing 1 to 4 carbon atoms and X is halogen or $NO_3$; and (c) a quaternary ammonium thickening agent of the formula

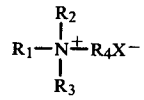

wherein $R_1$, $R_2$, $R_3$ and $R_4$ are hydrocarbyl groups containing 1 to 20 carbon atoms, at least one of which contains 16 to 20 carbon atoms and X is halogen or $NO_3$;

wherein:

(i) said mixture (a), said organic quaternary ammonium compound (b) and said thickening agent (c) are introduced into said reservoir in a single slug;

(ii) the concentration of said sulfobetaine in said slug is from about 0.25 to about 3 weight percent;

(iii) the ratio of said sulfobetaine to said alcohol is from 3:1 to 2:1, (iv) the concentration of said thickening agent (c) in said slug is from about 0.1 to about 5 weight percent; and (v) the concentration of said organic quaternary ammonium compound (b) in said slug is from about 0.5 to about 5 weight percent.

2. The method of claim 1, wherein said aliphatic alcohol contains 5 to 7 atoms.

3. The method of claim 1 wherein the alcohol is hexanol.

4. The method of claim 2 wherein the sulfobetaine has the formula $$C_{18}H_{37}-\underset{\underset{C_2H_4OH}{|}}{\overset{\overset{C_2H_4OH}{|}}{N^+}}-CH_2CH_2CH_2SO_3^-$$

5. The method of claim 2 wherein a compound of the formula $$(C_2H_5)_4N^+Br^-$$

is present.

6. The method of claim 2 wherein a compound of the formula $$C_{16}H_{33}-\underset{\underset{CH_3}{|}}{\overset{\overset{CH_3}{|}}{N^+}}-CH_3Br^-$$

is present.

7. The method of claim 2 in which said aqueous liquid comprises:
(1) a mixture of n-hexanol and a sulfobetaine of the formula $$C_{18}H_{37}-\underset{\underset{C_2H_4OH}{|}}{\overset{\overset{C_2H_4OH}{|}}{N^+}}-CH_2CH_2CH_2SO_3^-$$

(2) a compound of the formula $$C_{16}H_{33}-\underset{\underset{CH_3}{|}}{\overset{\overset{CH_3}{|}}{N^+}}-CH_3Br^-$$

and
(3) a compound of the formula $$(C_2H_5)_4N^+Br^-.$$

8. The method of claim 2, wherein the concentration of said sulfobetaine in said slug is from about 0.5 to about 2.0 weight percent.

9. The method of claim 2, wherein the concentration of said thickening agent in said slug is from about 1 to about 3 weight percent.

10. The method of claim 2, wherein the concentration of said organic quaternary ammonium compound (b) in said slug is from about 1 to about 3 weight percent.

11. The method of claim 2, wherein said slug is injected in an amount from about 0.1 to about 1.0 pore volumes.

12. The method of claim 2, wherein said slug is injected in an amount from about 0.25 to about 0.5 pore volumes.

* * * * *

UNITED STATES PATENT OFFICE
CERTIFICATE OF CORRECTION

Patent No. 4,370,243        Dated    January 25, 1983

Inventor(s) Catherine S. Hsia CHEN and Yuhshi LUH

It is certified that error appears in the above-identified patent and that said Letters Patent are hereby corrected as shown below:

In the specification, Column 6, line 55, change "was" to --as--.

In Claim 2, line 2, before "atoms" insert --carbon--.

Signed and Sealed this

Twenty-sixth Day of April 1983

[SEAL]

Attest:

GERALD J. MOSSINGHOFF

Attesting Officer     Commissioner of Patents and Trademarks